United States Patent
Linke et al.

(10) Patent No.: US 7,887,743 B2
(45) Date of Patent: Feb. 15, 2011

(54) METHOD AND APPARATUS FOR BLOW-MOLDING CONTAINERS

(75) Inventors: Michael Linke, Ahrensburg (DE); Michael Litzenberg, Geesthacht (DE); Frank Berger, Barsbüttel (DE); Rolf Baumgarte, Ahrenburg (DE); Frank Lewin, Tangstedt (DE)

(73) Assignee: KHS Corpoplast GmbH & Co. KG, Hamburg (DE)

( * ) Notice: Subject to any disclaimer, the term of this patent is extended or adjusted under 35 U.S.C. 154(b) by 0 days.

(21) Appl. No.: 12/224,930

(22) PCT Filed: Jan. 20, 2007

(86) PCT No.: PCT/DE2007/000101
§ 371 (c)(1),
(2), (4) Date: Sep. 3, 2009

(87) PCT Pub. No.: WO2007/104273
PCT Pub. Date: Sep. 20, 2007

(65) Prior Publication Data
US 2010/0007037 A1  Jan. 14, 2010

(30) Foreign Application Priority Data
Mar. 10, 2006  (DE)  .................. 10 2006 011 137

(51) Int. Cl.
*B29C 49/64* (2006.01)
*B29C 49/16* (2006.01)
*B29C 49/58* (2006.01)

(52) U.S. Cl. ................ 264/529; 264/535; 264/523; 425/522; 425/535

(58) Field of Classification Search ................ None
See application file for complete search history.

(56) References Cited

U.S. PATENT DOCUMENTS 4,830,810 A * 5/1989 Ufer et al. .................. 264/40.1

FOREIGN PATENT DOCUMENTS

| DE | 25 52 926 | 4/1975 |
| DE | 42 12 583 | 10/1993 |
| DE | 43 40 291 | 6/1995 |
| DE | 199 06 438 | 8/2000 |
| EP | 1 777 056 | 4/2007 |
| JP | 58/167889 | 10/1983 |
| JP | 2002/317770 | 10/2002 |
| WO | 2007/028493 | 3/2007 |

* cited by examiner

*Primary Examiner*—Monica A Huson
(74) *Attorney, Agent, or Firm*—Lucas & Mercanti, LLP; Klaus P. Stoffel

(57) ABSTRACT

The method and the apparatus serve for blow-molding containers. After thermal conditioning, a parison is formed into the container within a blowing mold of a blow-molding machine (41) by the action of blow-molding pressure. The required blow-molding gas is provided by a compressor (42). A compressor controller (44) is connected to a controller of the blow-molding machine in such a way that the controller of the blow-molding machine generates a setpoint value (49) for the initial pressure which is provided by the compressor.

18 Claims, 5 Drawing Sheets

METHOD AND APPARATUS FOR BLOW-MOLDING CONTAINERS

The invention concerns a method for blow molding containers, in which a preform is subjected to thermal conditioning and then molded into a container in a blow mold of a blow-molding machine by the action of blowing pressure, and in which a blowing gas is supplied by a compressor.

The invention also concerns an apparatus for blow molding containers, which has at least one blowing station with a blow mold, and in which the blowing station is connected with a compressor that has a compressor controller.

In container molding by the action of blowing pressure, preforms made of a thermoplastic material, for example, preforms made of PET (polyethylene terephthalate), are fed to different treatment stations within a blow-molding machine. A blow-molding machine of this type typically has a heating system and a blowing system, in which the preform, which has first been brought to a desired temperature, is expanded into a container by biaxial orientation. The expansion is effected by means of compressed air, which is introduced into the preform to be expanded. DE-OS 43 40 291 explains the process-engineering sequence in this type of preform expansion. The aforementioned introduction of compressed gas also comprises the introduction of compressed gas into the developing container bubble and the introduction of compressed gas into the preform at the beginning of the blowing operation.

The basic design of a blowing station for container molding is described in DE-OS 42 12 583. Possible means of bringing the preform to the desired temperature are explained in DE-OS 23 52 926.

Various handling apparatus can be used to convey the preforms and the blow-molded containers within the blow-molding apparatus. The use of transport mandrels, onto which the preforms are slipped, has proven especially effective. However, the preforms can also be handled with other supporting apparatuses. Other available designs involve the use of grippers for handling the preforms and the use of expanding mandrels, which can be inserted in the mouth region of the preform to support the preform.

The handling of containers with the use of transfer wheels is described, for example, in DE-OS 199 06 438, with the transfer wheel arranged between a blowing wheel and a delivery line.

The above-explained handling of the preform occurs, for one thing, in so-called two-step processes, in which the preforms are first produced by injection molding and temporarily stored and then later conditioned with respect to their temperature and blown into containers. For another, the preforms can be handled in so-called one-step processes, in which the preforms are first produced by injection molding and allowed to solidify sufficiently and are then immediately suitably conditioned with respect to their temperature and then blow molded.

With respect to the blowing stations that are used, various embodiments are known. In the case of blowing stations that are arranged on rotating transport wheels, book-like opening of the mold supports is often encountered. However, it is also possible to use mold supports that can be moved relative to each other or that are guided in a different way. In stationary blowing stations, which are suitable especially for accommodating several cavities for container molding, plates arranged parallel to one another are typically used as mold supports.

The blowing station is generally supplied with blowing gas, especially compressed air, by one or more compressors. The compressor is typically equipped with a compressor controller, and a compressed air reservoir is typically installed between the compressor and the blow-molding machine. The compressor controller controls the compressor in such a way that a predetermined pressure level is maintained in the compressed air reservoir. Typically, the compressor controller is adjusted in such a way that a pressure level of about 38 bars is provided in the compressed air reservoir. The blow-molding machine is equipped with a pressure control unit, which reduces the pressure supplied by the compressed air reservoir to a practical pressure level needed to mold the container.

Bottles of very different sizes are typically blown in conventional blow-molding machines. The volume capacities of the blown bottles vary in the range of 0.15 to 3.0 liters. The blowing pressures used to mold the containers also show relatively great variation, depending on the given bottle volume and the given bottle geometry. A typical blowing pressure is in the range of 22-38 bars.

A significant portion of the routine operating costs for manufacturing containers by blow molding results from supplying the necessary blowing air. To reduce these costs, it is known, for example, that the used blowing air can be repeatedly reused and that spent blowing air of a high pressure level can be fed back at a lower pressure level to the container molding operation. Since this type of recycling of blowing air cannot be extensively used in every case, the realization of this type of recycling alone is still not sufficient to satisfy the requirement of significant reduction of the operating costs in a completely satisfactory way.

Therefore, the objective of the present invention is to improve a method of the aforementioned type in a way that helps reduce operating costs.

In accordance with the invention, this objective is achieved by connecting a compressor controller with a controller of the blow-molding machine in such a way that the controller of the blow-molding machine generates a set point for the output pressure generated by the compressor.

A further objective of the invention is to design an apparatus of the aforementioned type in such a way that reduced operating costs are realized.

In accordance with the invention, this objective is achieved by connecting the compressor controller with a controller of the blow-molding machine and by connecting an output of the controller of the blow-molding machine to a set point input of the compressor controller.

The coupling of the compressor controller with the controller of the blow-molding machine makes it possible to operate the compressor in an energetically optimum way. As a result, the output pressure of the compressor is not raised to an unnecessarily high level then must then be reduced, but rather the compressor generates only the pressure level necessary for the given application.

The coupling of the compressor controller and the controller of the blow-molding machine produces an interconnected system between the blow-molding machine and the compressor plant, so that the electric power consumption of the compressor plant is reduced, which in turn means that operating costs are reduced.

To take different application requirements into account, it is provided that the compressor is operated with different output pressures that can be predetermined by the compressor controller.

Time delays in a production start of the blow-molding machine can be reduced to a minimum by providing that the compressor controller drives the compressor to generate a maximum intended output pressure without the controller of the blow-molding machine presetting a set point.

To provide the necessary communication paths, it is proposed that a coupling between the blow-molding machine and the compressor carry out at least unidirectional data transmission. Bidirectional data transmission is also advantageous.

Implementation work can be minimized if set point assignments for the output pressure to be generated by the compressor are preset by a control program of the blow-molding machine.

Technically related pressure losses can be taken into consideration if an output pressure of the compressor is determined by the addition of a blowing pressure required by the blow-molding machine and an additional differential pressure.

In particular, it is provided that the differential pressure is determined by adding a differential pressure of a pressure controller of the blow-molding machine, pressure losses of the connecting lines, and a hysteresis of the compressor controller.

In accordance with one embodiment, it is proposed that at least two blow-molding machines be connected to at least one compressor.

It is also possible for at least two compressors to be connected to at least one blow-molding machine.

To provide a stable supply pressure in the case of compressed air consumption that varies as a function of time, it is proposed that at least a portion of the compressed air supplied by the compressor be stored in a pressure reservoir.

Specific embodiments of the invention are schematically illustrated in the drawings.

Figure 1:
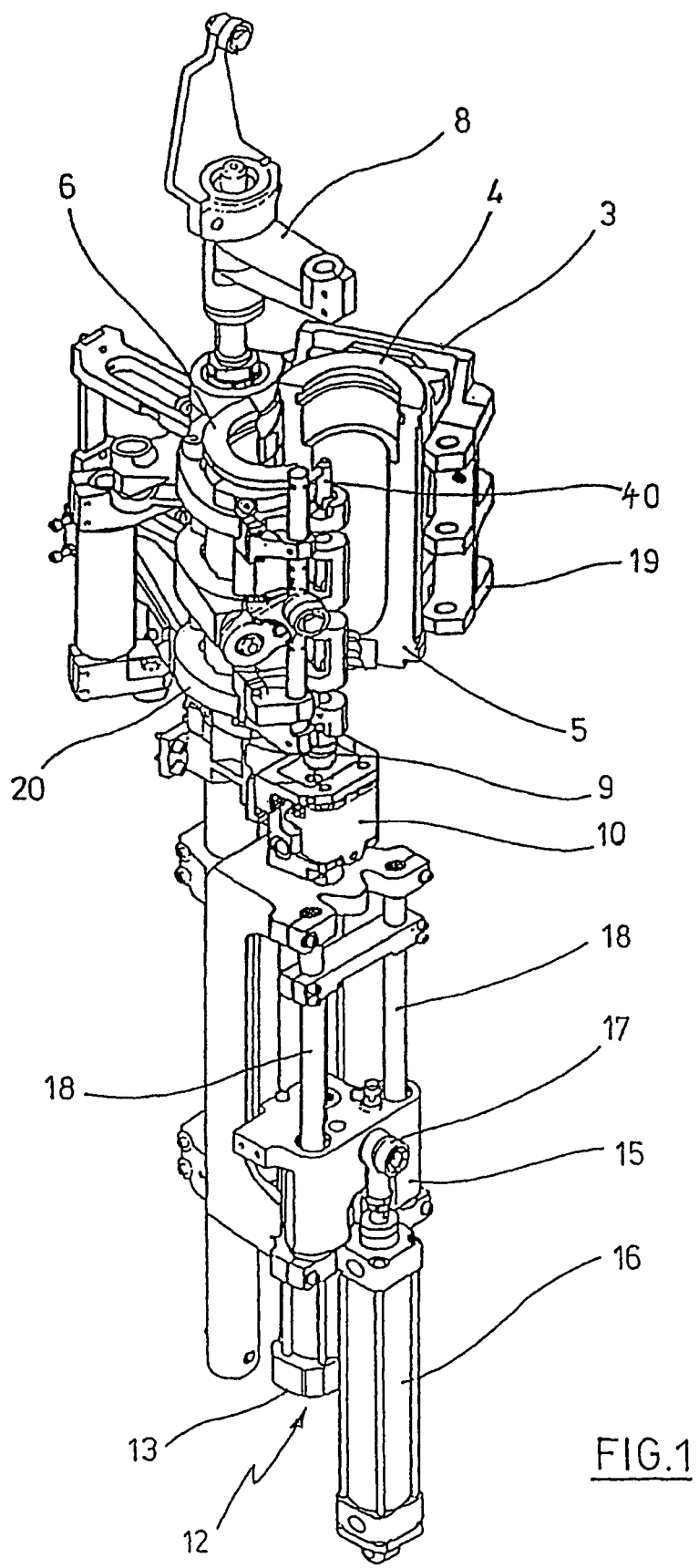
FIG. 1 shows a perspective view of a blowing station for producing containers from preforms.
Figure 2:
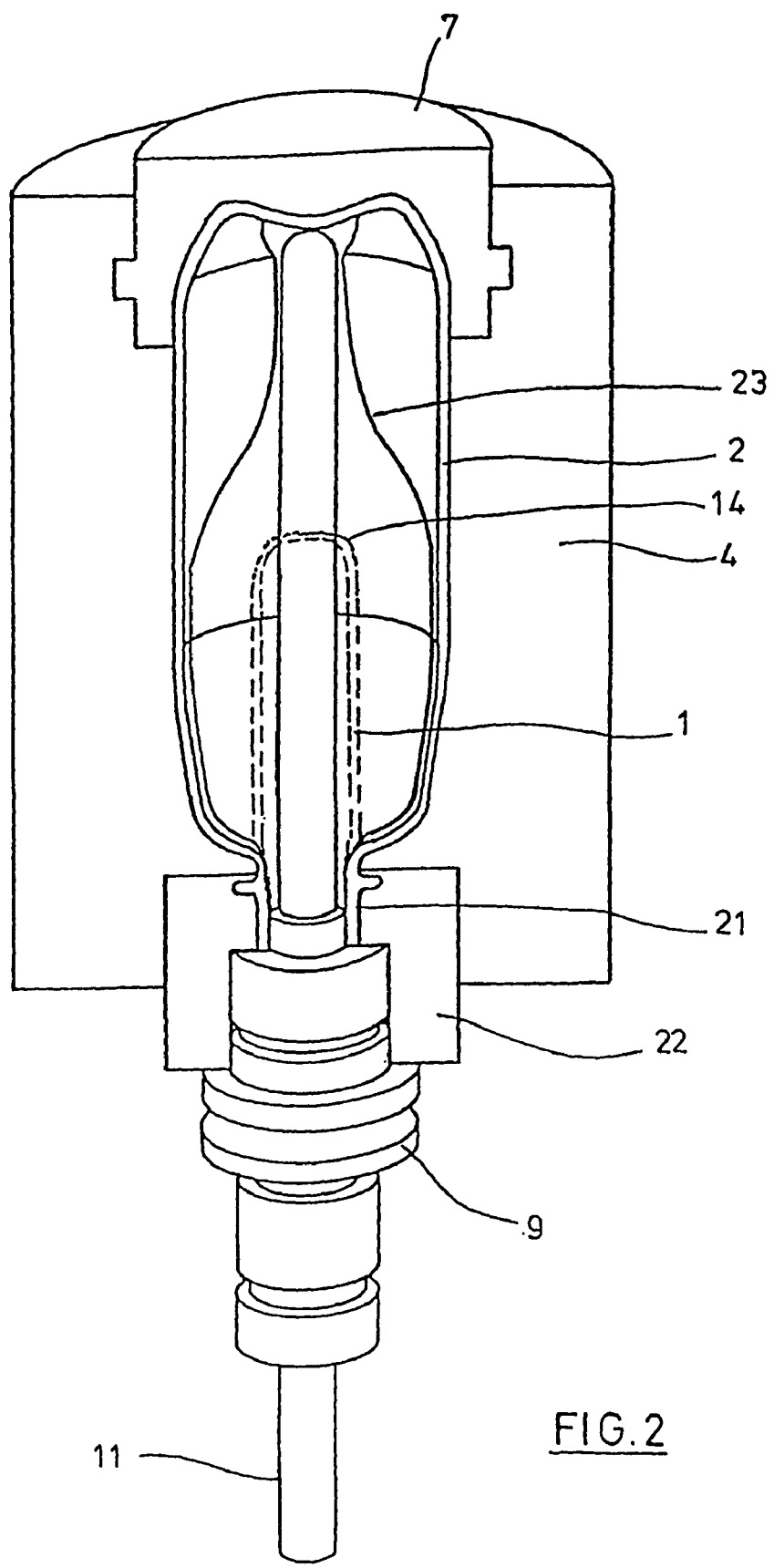
FIG. 2 shows a longitudinal section through a blow mold, in which a preform is stretched and expanded.

FIGS. 1 and 2 show the basic design of an apparatus for molding preforms 1 into containers 2.

The apparatus for molding the container 2 consists essentially of a blowing station 3, which is provided with a blow mold 4, into which a preform 1 can be inserted. The preform 1 can be an injection-molded part made of polyethylene terephthalate. To allow the preform 1 to be inserted into the blow mold 4 and to allow the finished container 2 to be removed, the blow mold 4 consists of mold halves 5, 6 and a base part 7, which can be positioned by a lifting apparatus 8. The preform 1 can be held in place in the area of the blowing station 3 by a transport mandrel 9. However, it is also possible to insert the preform 1 directly into the blow mold 4, for example, with grippers or other handling devices.

To allow compressed air to be fed in, a connecting piston 10 is arranged below the transport mandrel 9. It supplies compressed air to the preform 1 and at the same time produces a seal relative to the transport mandrel 9. However, in a modified design, it is also basically possible to use stationary compressed air feed lines.

In this embodiment, the preform 1 is stretched by means of a stretch rod 11, which is positioned by a cylinder 12. In accordance with another embodiment, the stretch rod 11 is mechanically positioned by means of cam segments, which are acted upon by pickup rollers. The use of cam segments is advantageous especially when a large number of blowing stations 3 is arranged on a rotating blowing wheel.

In the embodiment illustrated in FIG. 1, the stretching system is designed in such a way that a tandem arrangement of two cylinders 12 is provided. Before the start of the actual stretching operation, the stretch rod 11 is first moved into the area of a base 14 of the preform 1 by a primary cylinder 13. During the stretching operation itself, the primary cylinder 13 with the stretch rod extended, together with a carriage 15 that carries the primary cylinder 13, is positioned by a secondary cylinder 16 or by a cam control mechanism. In particular, it is proposed that the secondary cylinder 16 be used in such a way under cam control that a current stretching position is predetermined by a guide roller 17, which slides along a cam track while the stretching operation is being carried out. The guide roller 17 is pressed against the guide track by the secondary cylinder 16. The carriage 15 slides along two guide elements 18.

After the mold halves 5, 6, which are arranged in the area of supports 19, 20, are closed, the supports 19, 20 are locked relative to each other by means of a locking mechanism 40.

To adapt to different shapes of a mouth section 21 of the preform 1, provision is made for the use of separate threaded inserts 22 in the area of the blow mold 4, as shown in FIG. 2.

In addition to the blow-molded container 2, FIG. 2 shows the preform 1, which is drawn with broken lines, and also shows schematically a container bubble 23 in the process of development.

Figure 3:
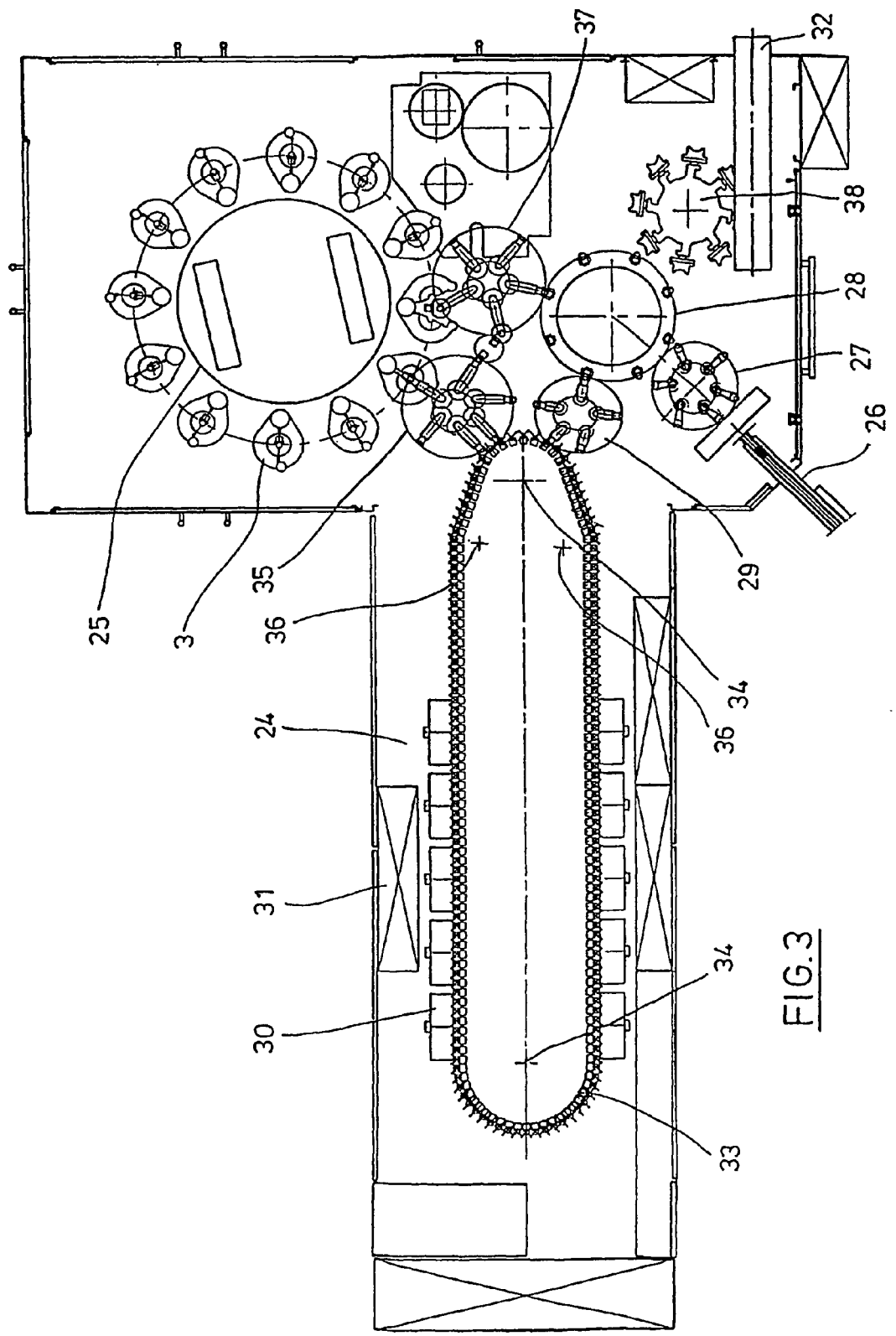
FIG. 3 is a drawing that illustrates a basic design of an apparatus for blow molding containers.

FIG. 3 shows the basic design of a blow-molding machine, which has a heating line 24 and a rotating blowing wheel 25. Starting from a preform feeding apparatus 26, the preforms 1 are conveyed to the area of the heating line 24 by transfer wheels 27, 28, 29. Radiant heaters 30 and fans 31 are arranged along the heating line 24 to bring the preforms 1 to the desired temperature. After sufficient heat treatment of the preforms 1, they are transferred to the blowing wheel 25, where the blowing stations 3 are located. The finished blow-molded containers 2 are fed to a delivery line 32 by additional transfer wheels.

To make it possible for a preform 1 to be blow molded into a container 2 in such a way that the container 2 has material properties that ensure a long shelf life of the foods, especially beverages, with which the container 2 is to be filled, specific process steps must be followed during the heating and orientation of the preforms 1. In addition, advantageous effects can be realized by following specific dimensioning specifications.

Various plastics can be used as the thermoplastic material. For example, PET, PEN, or PP can be used.

The preform 1 is expanded during the orientation process by feeding compressed air into it. The operation of supplying compressed air is divided into a preblowing phase, in which gas, for example, compressed air, is supplied at a low pressure level, and a subsequent main blowing phase, in which gas is supplied at a higher pressure level. During the preblowing phase, compressed air with a pressure in the range of 10 bars to 25 bars is typically used, and during the main blowing phase, compressed air with a pressure in the range of 25 bars to 40 bars is supplied.

FIG. 3 also shows that in the illustrated embodiment, the heating line 24 consists of a large number of revolving transport elements 33, which are strung together like a chain and are moved along by guide wheels 34. In particular, it is proposed that an essentially rectangular basic contour be set up by the chain-like arrangement. In the illustrated embodiment, a single, relatively large-sized guide wheel 34 is used in the area of the extension of the heating line 24 facing the transfer wheel 29 and a feed wheel 35, and two relatively small-sized guide wheels 36 are used in the area of adjacent deflections. In principle, however, any other types of guides are also conceivable.

To allow the closest possible arrangement of the transfer wheel 29 and the feed wheel 35 relative to each other, the illustrated arrangement is found to be especially effective, since three guide wheels 34, 36 are positioned in the area of the corresponding extension of the heating line 24, namely, the smaller guide wheels 36 in the area of the transition to the linear stretches of the heating line 24 and the larger guide wheel 34 in the immediate area of transfer to the transfer wheel 29 and to the feed wheel 35. As an alternative to the use of chain-like transport elements 33, it is also possible, for example, to use a rotating heating wheel.

After the blow molding of the containers 2 has been completed, the containers 2 are carried out of the area of the blowing stations 3 and conveyed to the delivery line 32 by the transfer wheel 28 and a delivery wheel 38.

Figure 4:
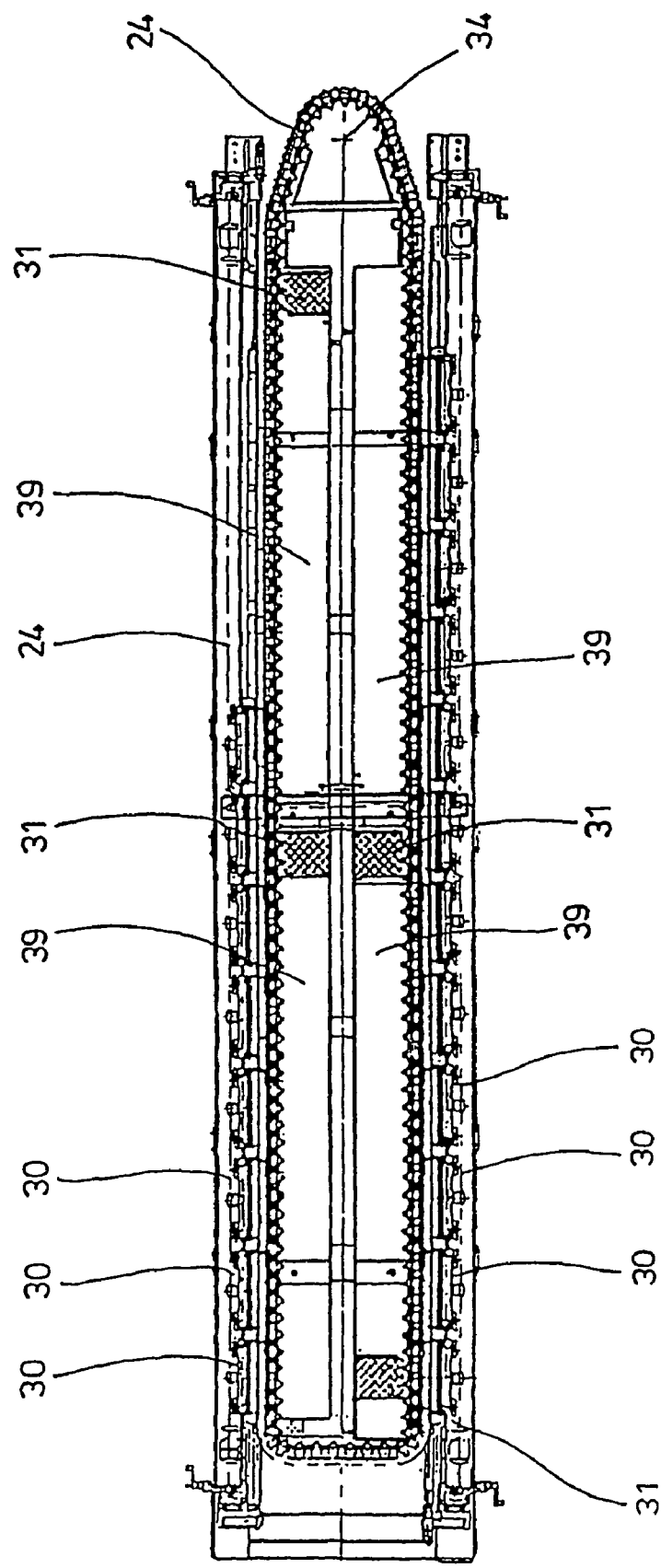
FIG. 4 shows a modified heating line with increased heating capacity.

In the modified heating line 24 illustrated in FIG. 4, a larger number of preforms 1 can be heated per unit time due to the larger number of radiant heaters 30. The fans 31 in this case feed cooling air into the area of cooling air ducts 39, which lie opposite the associated radiant heaters 30 and deliver the cooling air through discharge ports. A direction of flow of the cooling air essentially transverse to the direction of conveyance of the preforms 1 is realized by the arrangement of the discharge directions. In the area of surfaces opposite the radiant heaters 30, the cooling air ducts 39 can provide reflectors for the thermal radiation. It is also possible to realize cooling of the radiant heaters 30 by the delivered cooling air.

Figure 5:
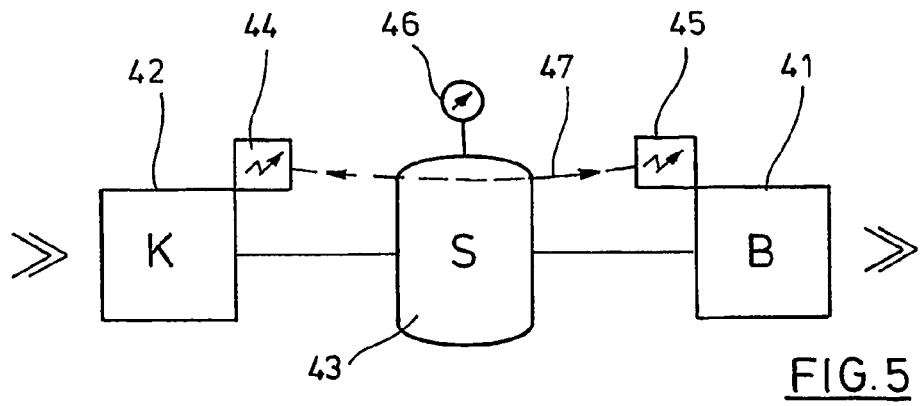
FIG. 5 is a block diagram that illustrates a complete plant comprising a compressor, pressure reservoir, and blow-molding machine.

FIG. 5 schematically illustrates the supplying of a blow-molding machine 41 with compressed air with the use of a compressor 42 and a pressure reservoir 43. The pressure reservoir 43 is typically designed as a tank. The compressor 42 has a compressor controller 44, and the blow-molding machine 41 has a controller 45. The pressure reservoir 43 is equipped with a pressure gauge 46, which supplies an actual value for the output pressure produced by the compressor 42 to the compressor controller 44.

The compressor controller 44 and the controller 45 of the blow-molding machine are connected with each other by a coupling 47. The coupling 47 can be realized in different technical variants. For example, a cable connection or a wireless connection is possible. In the case of a cable connection, the data can be transferred electrically or optically. Wireless connections can be provided by radio links, infrared links or other contactless communication paths.

Figure 6:
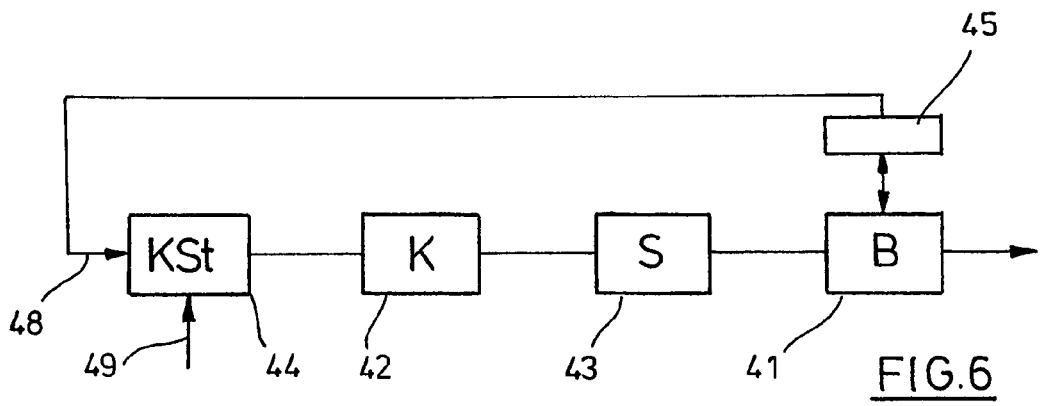
FIG. 6 is a diagram that is modified relative to the diagram in FIG. 5.

The diagram in FIG. 6, which is modified relative to the diagram in FIG. 5, shows that the controller 45 of the blow-molding machine 41 supplies a preassigned value for the compressor controller 44 at the set point input 48. In addition, the compressor controller 44 has an input 49 for a reference set point. The set point input 48 and the input 49 can be linked with a priority control. This means that when a reference value of the blow-molding machine 41 is present, the compressor considers it as the set point, but when an external reference value of this type is absent, the compressor considers the set point supplied by the input 49.

Taking the aforementioned priority control into consideration, it is possible, for example, without the blow-molding machine 41 being turned on, to supply the pressure reservoir 43 with a basic pressure. This can be, for example, the maximum output pressure generated by the compressor, for example, a pressure of 38 bars. This guarantees that independently of an actual blowing pressure required by the blow-molding machine 41, the required blowing pressure is supplied without any time delay. After the blow-molding machine 41 has been turned on, a set point for the blowing pressure actually required is then present at the set point input 48, and the compressor 42 provides an associated output pressure in the pressure reservoir 43.

For optimized control of the compressor 42, it is taken into consideration that the blowing stations 3 are not supplied with the full output pressure generated by the compressor 42, but rather that pressure losses are to be expected. Advantageously, therefore, the compressor 42 supplies the blowing pressure actually needed by the blowing stations 3 plus a differential pressure. A delivery pressure $P_{K-S}$ in the compressor reservoir system can be determined by evaluating the following formula:

$$P_{K-S} = P_{Bd} + \Delta P_{Br} + \Delta P_{DV} + \Delta P_{K-S-H}$$

where $P_{Bd}$=blowing pressure needed in the machine.

$\Delta P_{Br}$=pressure difference, which the blowing pressure controller in the blow-molding machine needs for automatic control $\Delta P_{DV}$=pressure losses due to flow between reservoir and blowing pressure controller $\Delta P_{K-S-H}$=compressor-reservoir system hysteresis, which results from the turn-on and turn-off pressures of the compressor.

An evaluation of the above formula is explained by the following example, which shows how the demand control of the compressed air affects the reservoir pressure and thus the power consumption of the compressor:

|  | Bottle A | Bottle B |
| --- | --- | --- |
| $P_{Bd}$ = | 36 bars | 24 bars |
| $\Delta P_{Br}$ = | 2 bars | 2 bars |
| $\Delta P_{DV}$ = | 0.5 bars | 0.5 bars |
| $\Delta P_{K-S-H}$ = | 1 bar | 1 bar |
| $P_{K-S}$ = | 39.5 bars | 27.5 bars |

Evaluation of the above table reveals that the blow molding of bottle (B) requires an output pressure of the compressor 42 about 12 bars lower than the output pressure required for blow molding bottle (A). Due to the reduction of the output pressure of the compressor, it does not need to compress the supplied air to the unnecessarily high pressure level. At typical compressed air consumption rates of about 1000 to 3000 standard cubic meters per hour, this results in a considerable energy savings potential.

Figure 7:
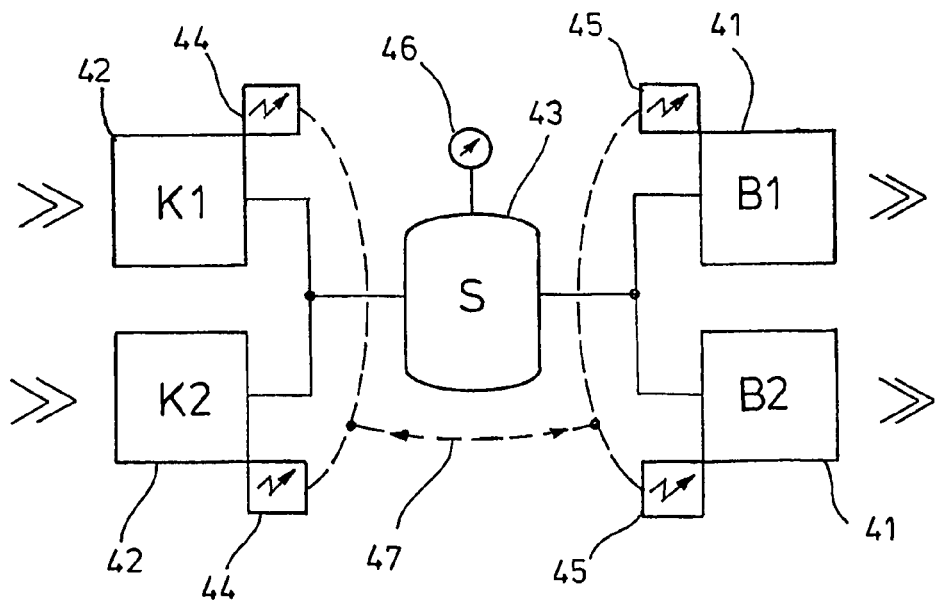
FIG. 7 is a diagram that illustrates a system that comprises several compressors and several blow-molding machines.

FIG. 7 shows a more complex production plant, which consists of two compressors 42 and two blow-molding machines 41, which are coupled with one another by a common pressure reservoir 43. In an arrangement of this type, the two compressors 42 are preferably operated with equal set points. The blow-molding machines 41 each supply set points for the compressor controller 44, which result from the containers 42 that are to be produced by the individual blow-molding machines 41. The compressor controller 44 makes available the higher of the required pressure levels.

In principle, any numbers of compressors 42 and blow-molding machines 21 can be coupled with one another, depending on the practical requirements of the given application. In this regard, it is merely necessary to ensure that the required total demand of the blow-molding machines 41 for compressed air is supplied by the compressors 42 and that the blow-molding machine 41 that needs the highest blowing pressure is supplied with at least this pressure level.

The controller 45 of the blow-molding machine typically comprises an operating unit, which stores and varies predetermined formulations for the production of the containers 3. The formulations contain the required blowing pressure as a production parameter. A pressure controller of the blow-molding machine 41 is controlled as a function of this blowing pressure parameter. This blowing pressure parameter can thus also be made available to the compressor controller 44 without much effort. The practically required differential pressure by which the output pressure of the compressor 42 must be higher than the practically required blowing pressure can thus be computed both in the controller 45 of the blow-molding machine 41 and in the compressor controller 44. The computation is preferably performed in the controller 45 of the blow-molding machine 41, since all necessary information is available there, and modifications of the compressor controller 44 are avoided.

The invention claimed is:

1. A method for blow molding containers, in which a preform is subjected to thermal conditioning and then molded into a container in a blow mold of a blow-molding machine by the action of blowing pressure, and in which the blowing gas is supplied by a compressor, wherein a compressor controller (44) is connected with a controller (45) of the blow-molding machine (41) in such a way that the controller (45) of the blow-molding machine (41) generates a set point for the output pressure generated by the compressor (42), wherein an output pressure of the compressor (42) is determined by the addition of a blowing pressure required by the blow-molding machine (41) and an additional differential pressure.

2. A method in accordance with claim 1, wherein the compressor (42) is operated with different output pressures that can be predetermined by the compressor controller (44).

3. A method in accordance with claim 1, wherein the compressor controller (44) drives the compressor (42) to generate a maximum intended output pressure without the controller (45) of the blow-molding machine (41) presetting a set point.

4. A method in accordance with claim 1, wherein a coupling (47) between the blow-molding machine (41) and the compressor (42) carries out at least unidirectional data transmission.

5. A method in accordance with claim 1, wherein set point assignments for the output pressure to be generated by the compressor (42) are preset by a control program of the blow-molding machine (41).

6. A method in accordance with claim 1, wherein the differential pressure is determined by adding a differential pressure of a pressure controller of the blow-molding machine, pressure losses of the connecting lines, and a hysteresis of the compressor controller (44).

7. A method in accordance with claim 1, wherein at least two blow-molding machines (41) are connected to at least one compressor (42).

8. A method in accordance with claim 1, wherein at least two compressors (42) are connected to at least one blow-molding machine (41).

9. A method in accordance with claim 1, wherein at least a portion of the compressed air supplied by the compressor (42) is stored in a pressure reservoir (43).

10. An apparatus for blow molding containers, which has at least one blowing station with a blow mold, and in which the blowing station is connected with a compressor that has a compressor controller, wherein the compressor controller (44) is connected with a controller (45) of the blow-molding machine (41) and that an output of the controller (45) of the blow-molding machine (41) is connected to a set point input (48) of the compressor controller (44), wherein the controller (45) has a computing unit for determining a required output pressure of the compressor (42) by addition of a practical blowing pressure and a differential pressure.

11. An apparatus in accordance with claim 10, wherein the compressor controller (44) is designed for presetting different output pressures of the compressor (42).

12. An apparatus in accordance with claim 10, wherein the compressor controller (44) has an input (49) for a basic set point that is subordinate to the set point input (48).

13. An apparatus in accordance with claim 10, wherein a coupling (47) between the blow-molding machine (41) and the compressor (42) is designed to carry out at least unidirectional data transmission.

14. An apparatus in accordance with claim 10, wherein the controller (45) of the blow-molding machine (41) has a control program for presetting set points for a practical blowing pressure.

15. An apparatus in accordance with claim 10, wherein the computing unit is designed for forming the differential pressure from a differential pressure of the blowing pressure controller, pressure losses along the flow lines, and a controller hysteresis of the compressor (42).

16. An apparatus in accordance with claim 10, wherein at least two blow-molding machines (41) are connected to at least one compressor (42).

17. An apparatus in accordance with claim 1, wherein at least two compressors (42) are connected to at least one blow-molding machine (41).

18. An apparatus in accordance with claim 1, wherein a compressed air coupling connecting the compressor (42) with the blow-molding machine (41) has at least one pressure reservoir (43).

* * * * *